United States Patent

[11] 3,551,649

[72] Inventor Edward V. Weber
Poughkeepsie, N.Y.
[21] Appl. No. 625,471
[22] Filed Mar. 23, 1967
[45] Patented Dec. 29, 1970
[73] Assignee International Business Machines Corporation
Armonk, N.Y.
a corporation of New York

[54] POSITION MEASURING SYSTEM

5 Claims, 17 Drawing Figs.

[52] U.S. Cl. ..... 235/92, 235/151.32; 324/83; 340/282, 347
[51] Int. Cl. ..... G06m 7/00, H03k 21/30
[50] Field of Search ..... 324/83; 340/347, 282; 235/92, 151.32

[56] References Cited

UNITED STATES PATENTS

| | | | |
|---|---|---|---|
| 3,227,863 | 1/1966 | Winsor | 235/151.11 |
| 3,353,161 | 11/1967 | Toscano | 340/172.5 |
| 3,414,718 | 12/1968 | McElroy | 235/92 |
| 3,231,885 | 1/1966 | Blauvelt. | |
| 3,366,886 | 1/1968 | Dryden | 328/233 |
| 3,250,899 | 5/1966 | Smith | 235/152 |

OTHER REFERENCES

T.S. Hahs, "Interpolation Between Periodic Measurements of Phase" April 1966, IBM Technical Disclosure Bulletin, page 1501.

*Primary Examiner*—Maynard R. Wilbur
*Assistant Examiner*—Robert F. Gnuse
*Attorneys*—Hanifin and Jancin and Gunter A. Hauptman

ABSTRACT: The invention is disclosed in the environment of a conveyor system having a number of work stations, at least one of which work stations includes a number of probes connected to position sensors. The position sensors transducers affect a source signal supplied to the two primary windings of each transducer as a function of the physical position of the associated probes. A single oscillator and a common counter supply the source signal to the position sensors on predetermined counts. The counter is connected to a gate and an indicator associated with each sensor. The output signal of the secondary windings of the transducers is used to gate the current count of the counter to the indicators when the output signal has a predetermined value, thus indicating the position of the probe.

COUNTER & CONTROLS

INVENTOR
EDWARD V. WEBER

BY Gunter A. Hauptman
ATTORNEY

HIGH COUNTER CONTROLS 56

COSINE AMPLIFIER & CONTROL 33

PHASE CONTROLLER 63

AMPLIFIER 60

POSITION MEASURING SYSTEM

This invention relates to an improvement in a manufacturing system incorporating a conveyor line extending past work stations, and more particularly, electronic position measuring equipment locatable at such stations.

In the prior art manufacturing systems, a workpiece is mounted on a pallet movable past successive work stations by a conveyor. Each work station performs a manufacturing operation, so that as the workpiece progresses down the line it progresses through successive steps of the manufacturing process. An essential step in the manufacturing process is measurement of dimensions of the workpiece. It is desirable that this measurement be made during normal pauses at work stations, so that the progress of the manufacturing process is not disrupted.

Apart from purely manual techniques, prior art measurement devices have sensed the workpiece position and dimensions with mechanical probes which are attached to mechanical-to-electrical converters for converting the position of the stator into corresponding electrical signals. A well known type of mechanical-to-electrical converter or "sensor" is known as a "resolver," "synchro" or "magnetic transducer." Such magnetic transducers convert an angular or linear displacement into an electrical signal by a variation in mutual inductance between one or more primary (excited) windings and one or more secondary windings. In a typical application, a movable primary winding (rotor) of a magnetic transducer is electrically excited with a cyclical signal and is physically connected to a probe contacting the workpiece to be measured. A fixed secondary winding stator supplies a cyclical output signal differing in phase from the exciting signal as a function of the physical position of the primary windings. The mechanical position sensed by the transducer and converted into a phase difference by the transducer can be detected and indicated by electronic circuitry capable of measuring the phase shift caused by the physical displacement.

In one prior art electronic circuit, oscillator signals step a counter, particular counts of which are used to supply sine and cosine signals to two windings of the transducer. The output winding of the resolver is sensed by a null detector which determines when the transducer output signal is zero. A switch permits the null detector to also sense when the cosine signal supplied to the resolver is zero. When a cosine signal zero crossing is detected by the null detector, a second counter starts counting the number of oscillator signals. When the null detector senses a transducer output signal zero crossing, the second counter stops. The count stored in the second counter is directly proportional to the phase shift, between the cosine signal and the transducer output signal, caused by the physical position of the transducer. Successive readings from the second counter indicate changes in position of the transducer and thus, with appropriate probes and probe positioning, may be used to measure the dimensions of a workpiece. Additional dimensions may be measured by providing transducers and duplicate electronic circuits for each dimension.

It is evident from the preceding description, that the switch required in the prior art device limits the frequency of updating of the second counter (which indicates the position of the resolver). In the prior art device, the inherent drift of the electronic circuits requires additional compensating and synchronizing circuits to guarantee that the second counter is, in fact, recording the resolver position. The number of duplicate circuits required in the prior art device is in direct proportion to the number of dimensions measured and two counters are required for each dimension. Since the maximum counting capability of the second counter determines the measuring precision and capacity of the system, the prior art device has a large number of circuits for its designed speed of operation.

It is therefore an object of this invention to provide a position measuring system wherein the position may be sensed more frequently than permitted in the prior art.

Another object of this invention is to provide in a manufacturing system, an electronic position-measuring circuit integrally compensating for inherent drift.

Still another object of this invention is to provide electronic circuitry for measuring mechanical position wherein the same electronic circuitry used to measure one dimension may also be used to measure additional dimensions.

A further object of this invention is to eliminate the need of expensive devices in a position-measuring system, by utilizing the same devices for several functions.

Another object is to improve a position-measuring system having a counter with a fixed operating cycle, by providing means for increasing the precision or capacity of the system without changing the counter operating cycle.

A still further object of this invention is to provide, in a position measuring system, an indication of the direction in which a periodically sensed device has passed a predetermined point during intersensing periods.

An additional object is to provide a measuring system having a minimum number of circuits for the design speed of the system.

The foregoing and other object, features and advantages of the invention will be apparent from the following more particular description of the preferred embodiment of the invention, as illustrated in the accompanying drawings.

In the invention herein disclosed, these objects are achieved by providing, in a multidimensional position-sensing system, a single counting means connected to a single oscillator. Transducers and null detectors are, however, provided for each dimension to be measured. The oscillator drives the counter which in turn supplies sinusoidal signals to two primary windings of each transducer. The null detector associated with each transducer supplies a pulse, each time that the associated transducer's secondary winding output signal passes through zero, which samples the current contents of the counter into a register or other indicating means. The register thus indicates the position of the associated transducer and changes its contents to indicate changes in the position of the associated transducer. A single counter may measure many dimensions if a separate register is provided for each dimension. Since the sinusoidal signals for the transducer and the current count originate in a single counter, no synchronization problems exist. Minor component drifts are compensated for by measuring the relationship between the counter contents and the signals received by the sensors and making compensating adjustments. The direction in which the counter passes through a predetermined point between successive samplings is detected by monitoring a selected position registered by the counter and, selectively, incrementing or decrementing higher-order positions in accordance with the results of the monitoring. This increases the precision or capacity of the system without changing the operation of the lower-order positions of the counter.

In the FIGS.:

Figure 5B:
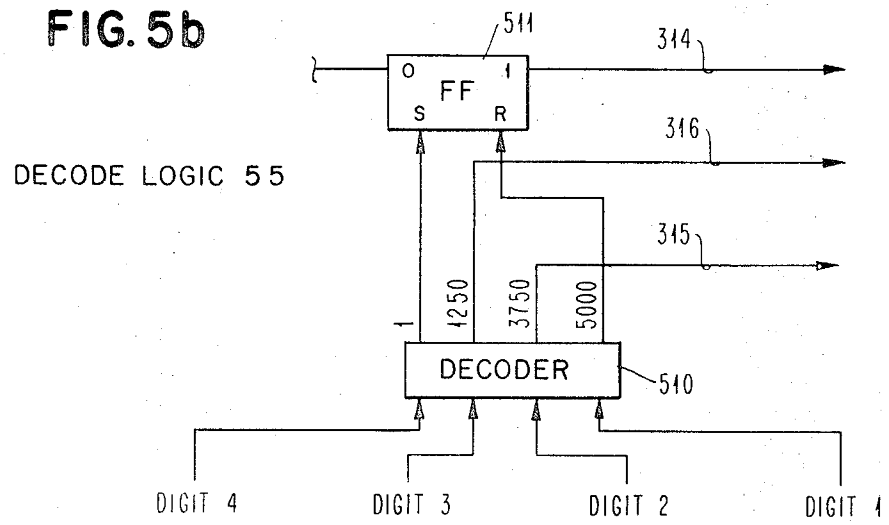
Figure 5C:
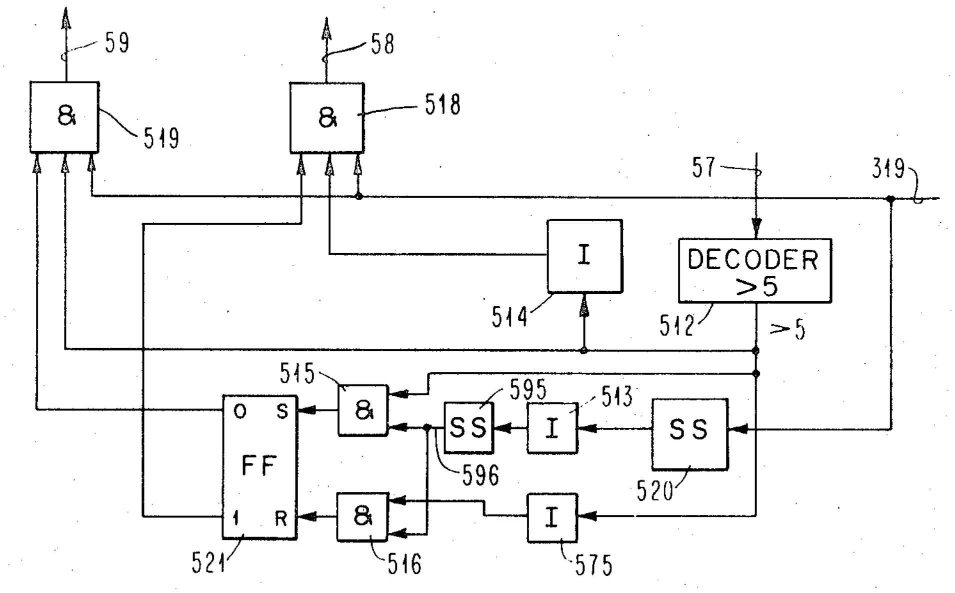
Figure 5A:
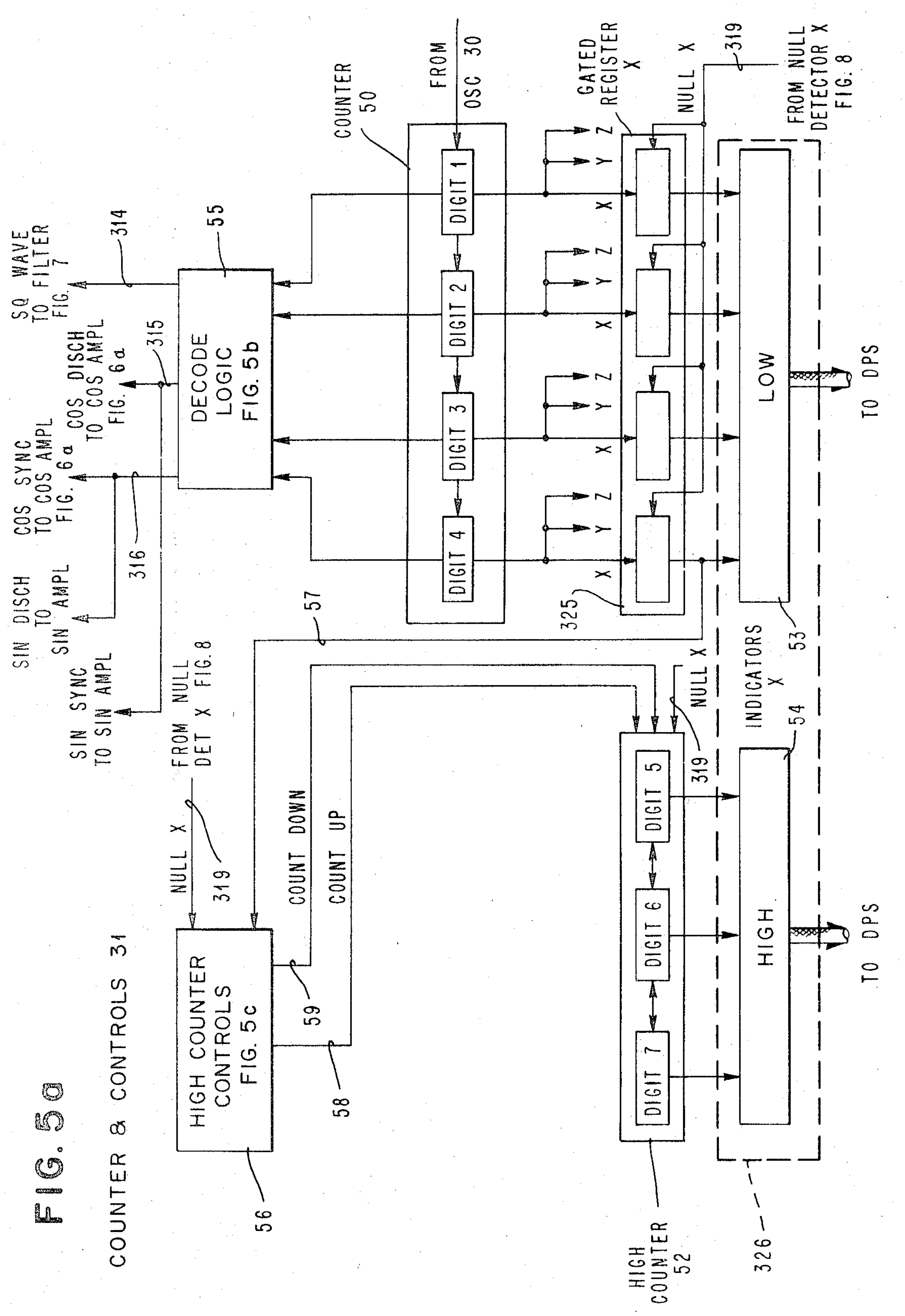

FIG. 5*a* is a logic diagram showing the details of the counter and controls.

FIG. 5*b* is a logic diagram showing the details of the decode logic.

FIG. 5*c* is a logic diagram showing the details of the high counter controls.

Figure 6A:
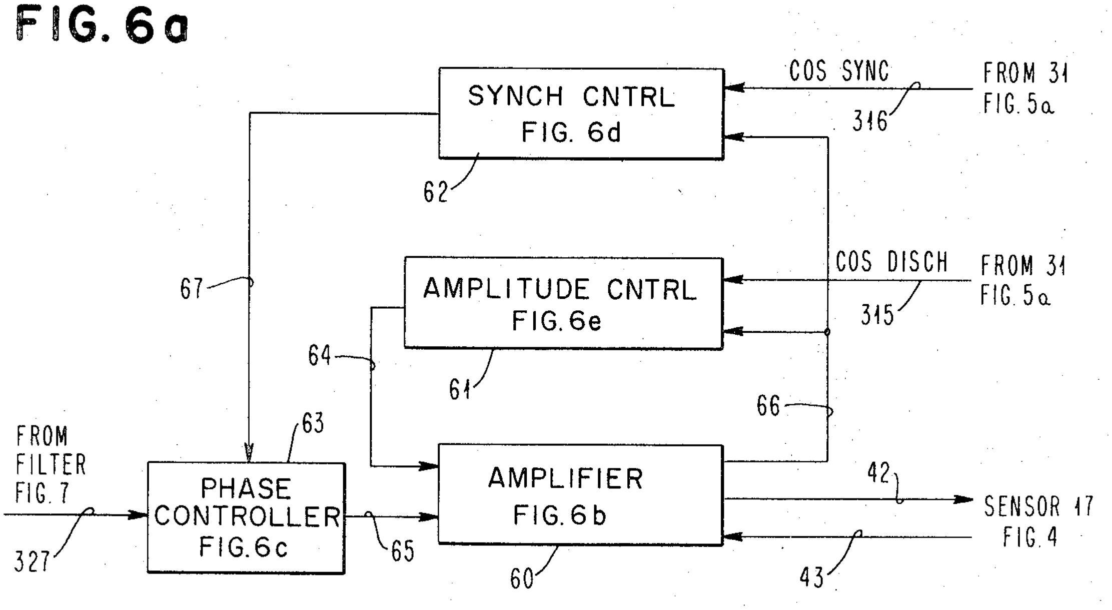

FIG. 6*a* is a logic diagram showing the details of the cosine amplifier and control and is illustrative of the sine amplifier and controls.

Figure 6C:
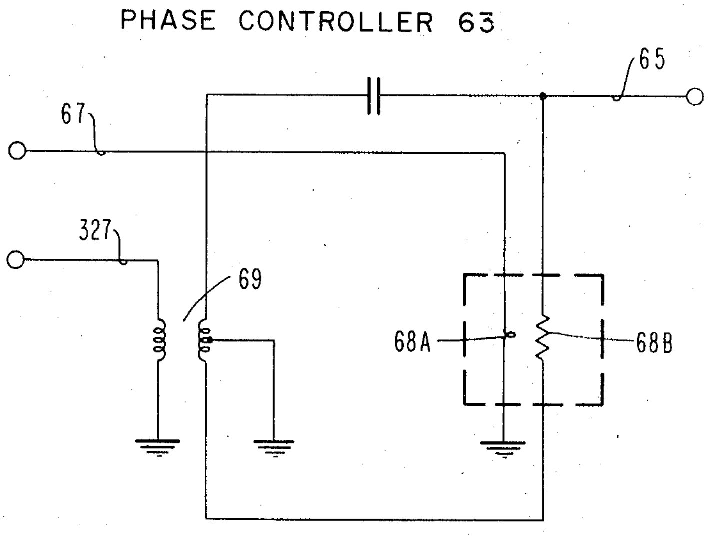
Figure 6B:
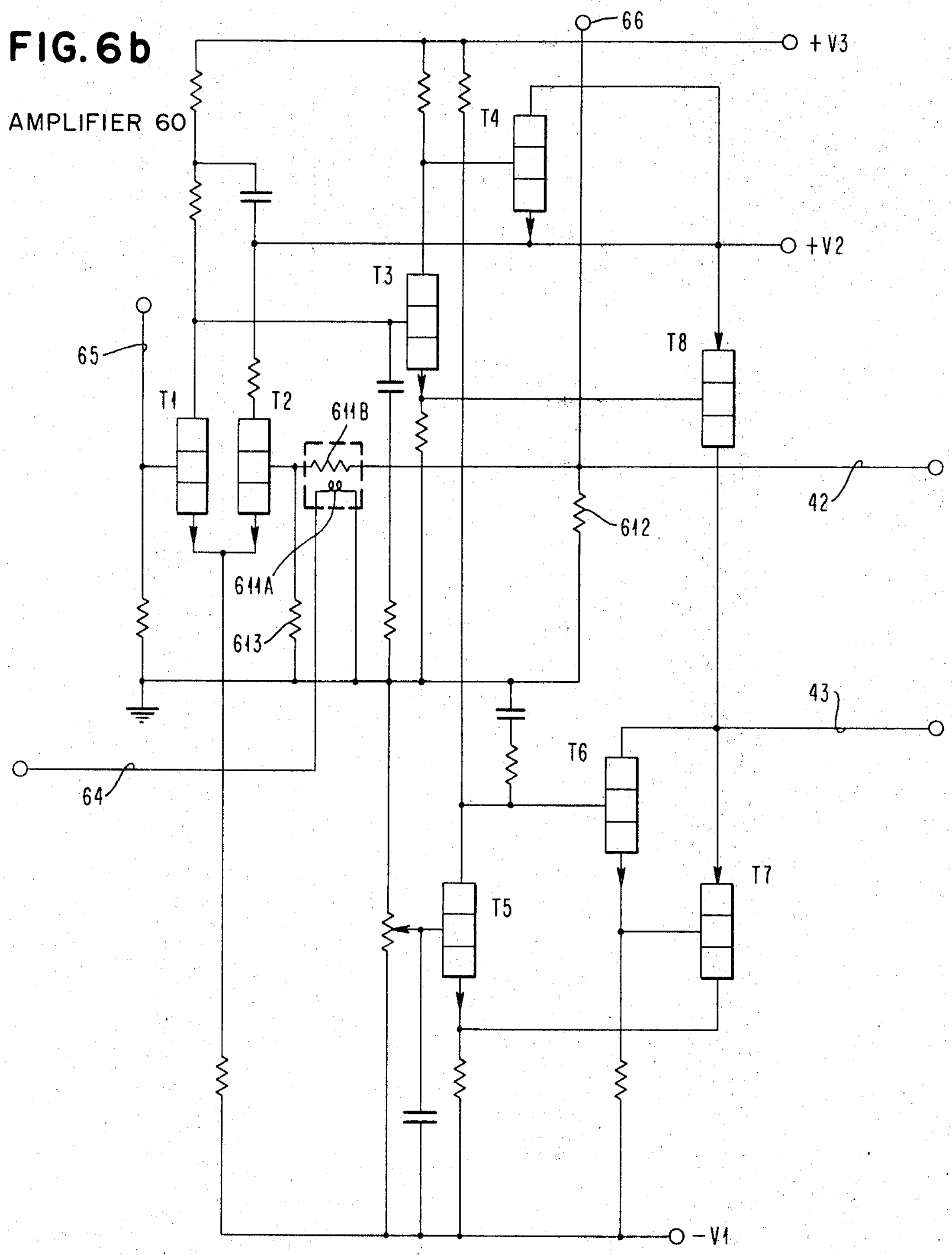

FIG. 6*b* is a schematic diagram of an illustrative amplifier.

FIG. 6*c* is a schematic diagram of an illustrative phase controller.

Figure 6D:
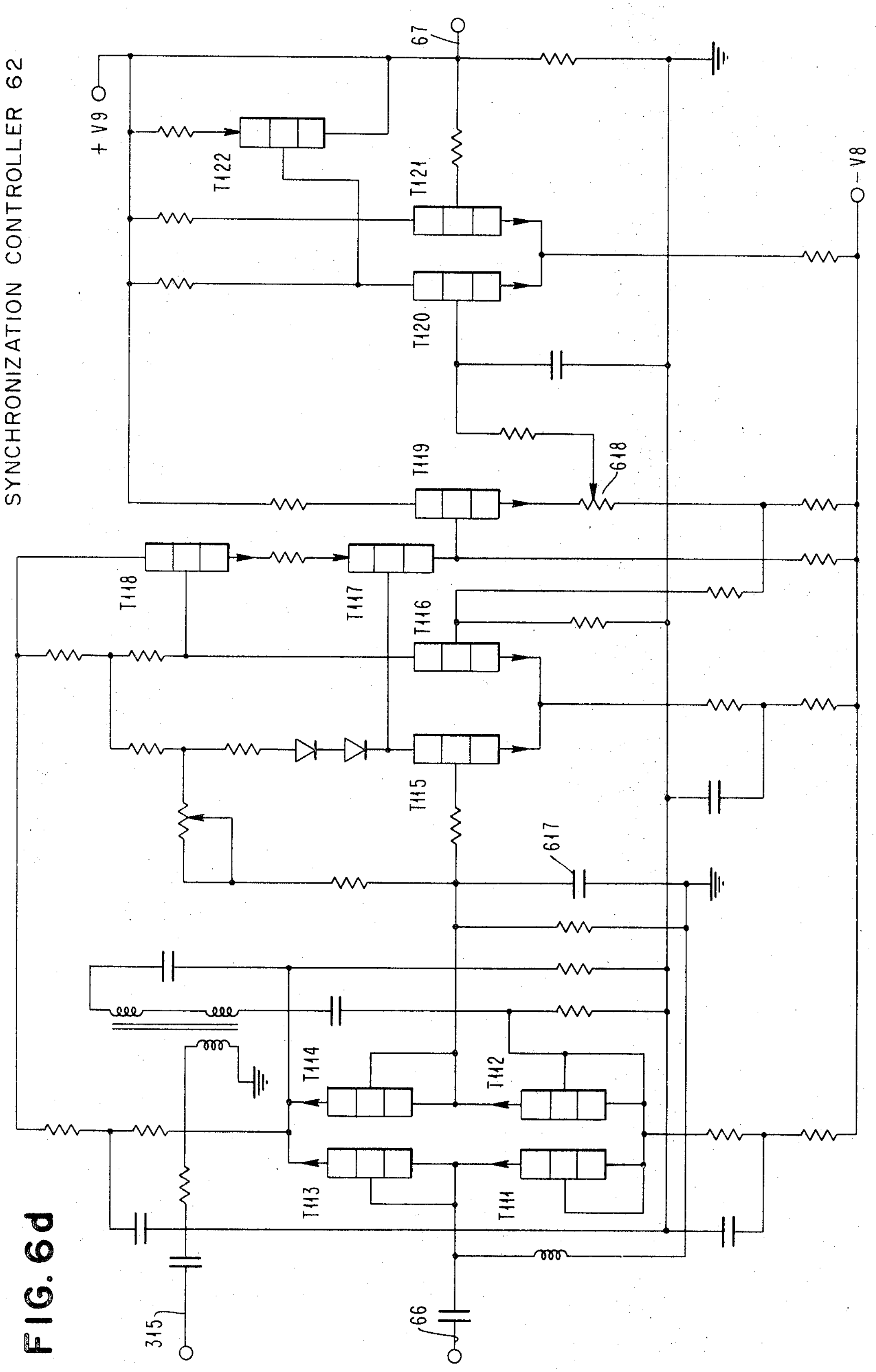

FIG. 6*d* is a schematic diagram of an illustrative synchronization controller.

Figure 6E:
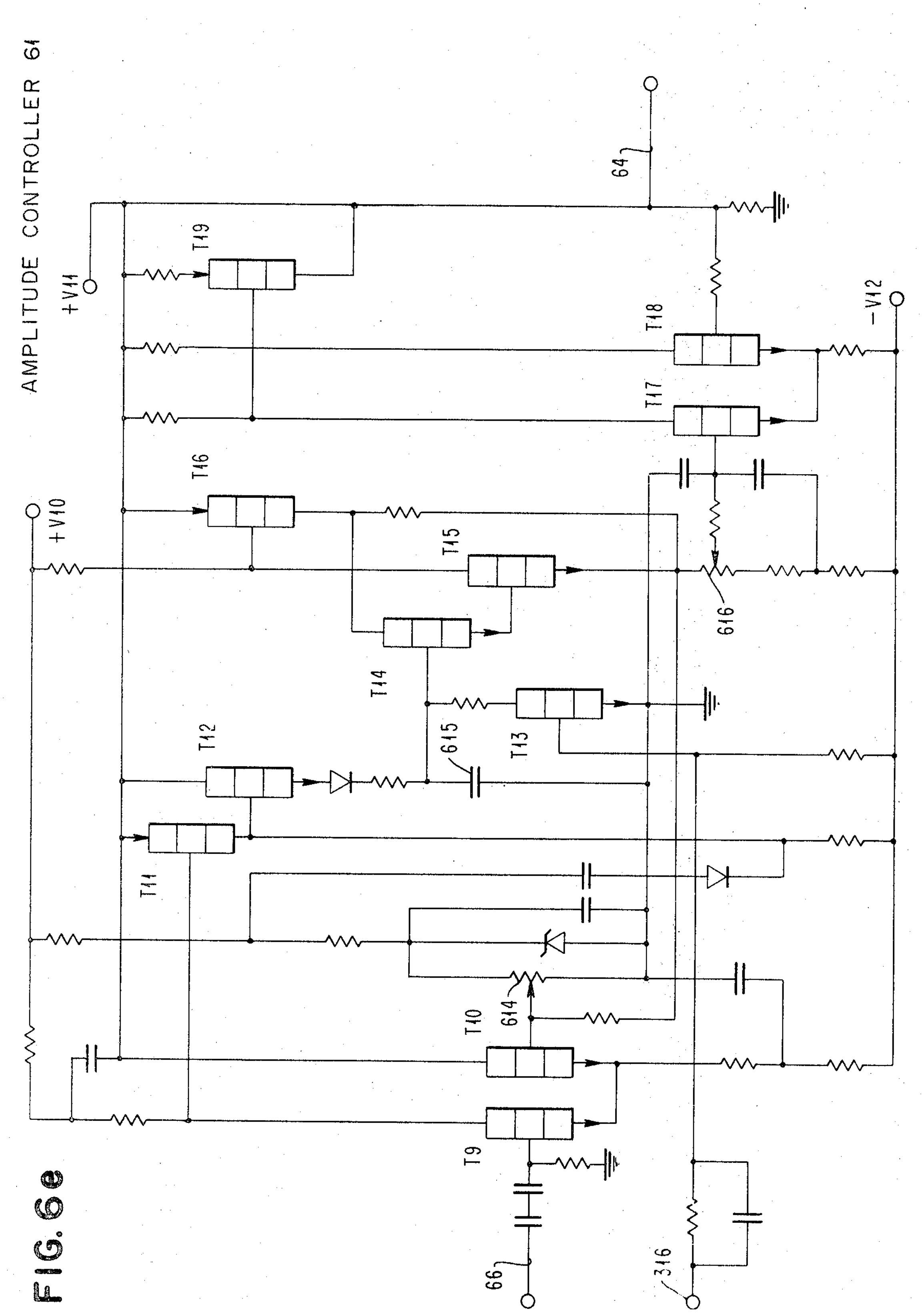

FIG. 6*e* is a schematic diagram of an illustrative amplitude controller.

Figure 7:
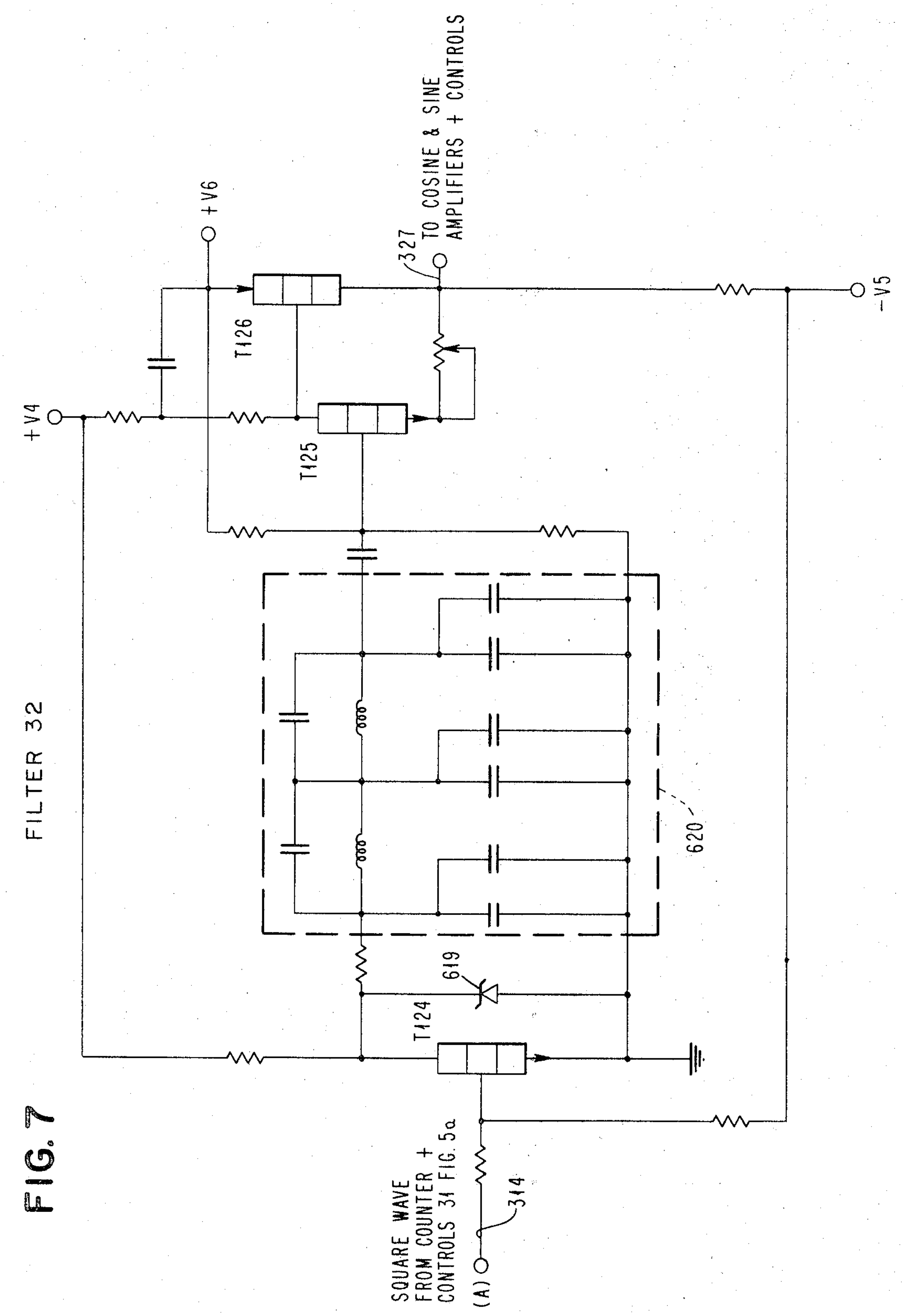

FIG. 7 is a schematic diagram of an illustrative filter.

Figure 8:
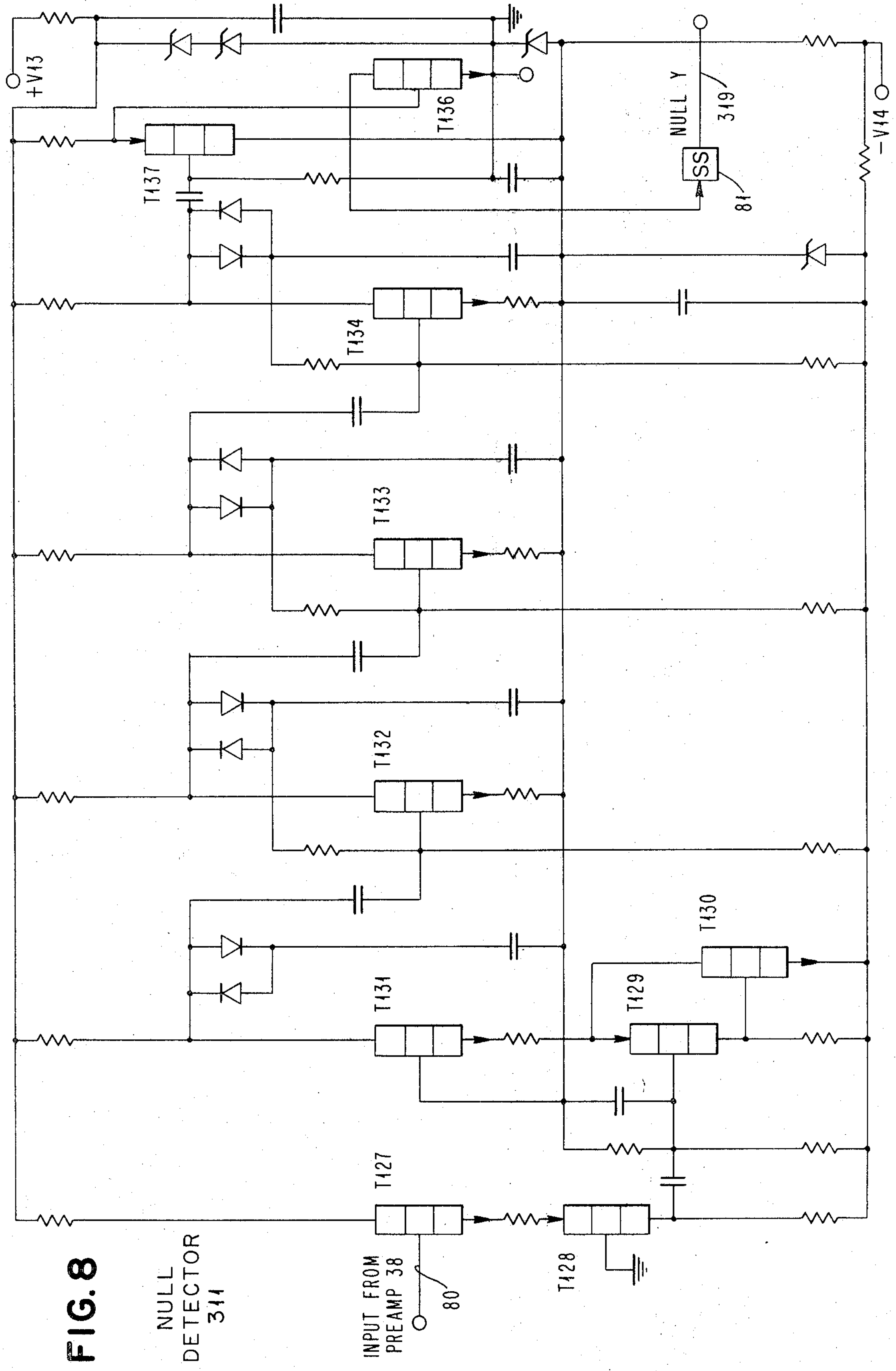

FIG. 8 is a schematic diagram of an illustrative null detector.

Figures 9A, 9B:
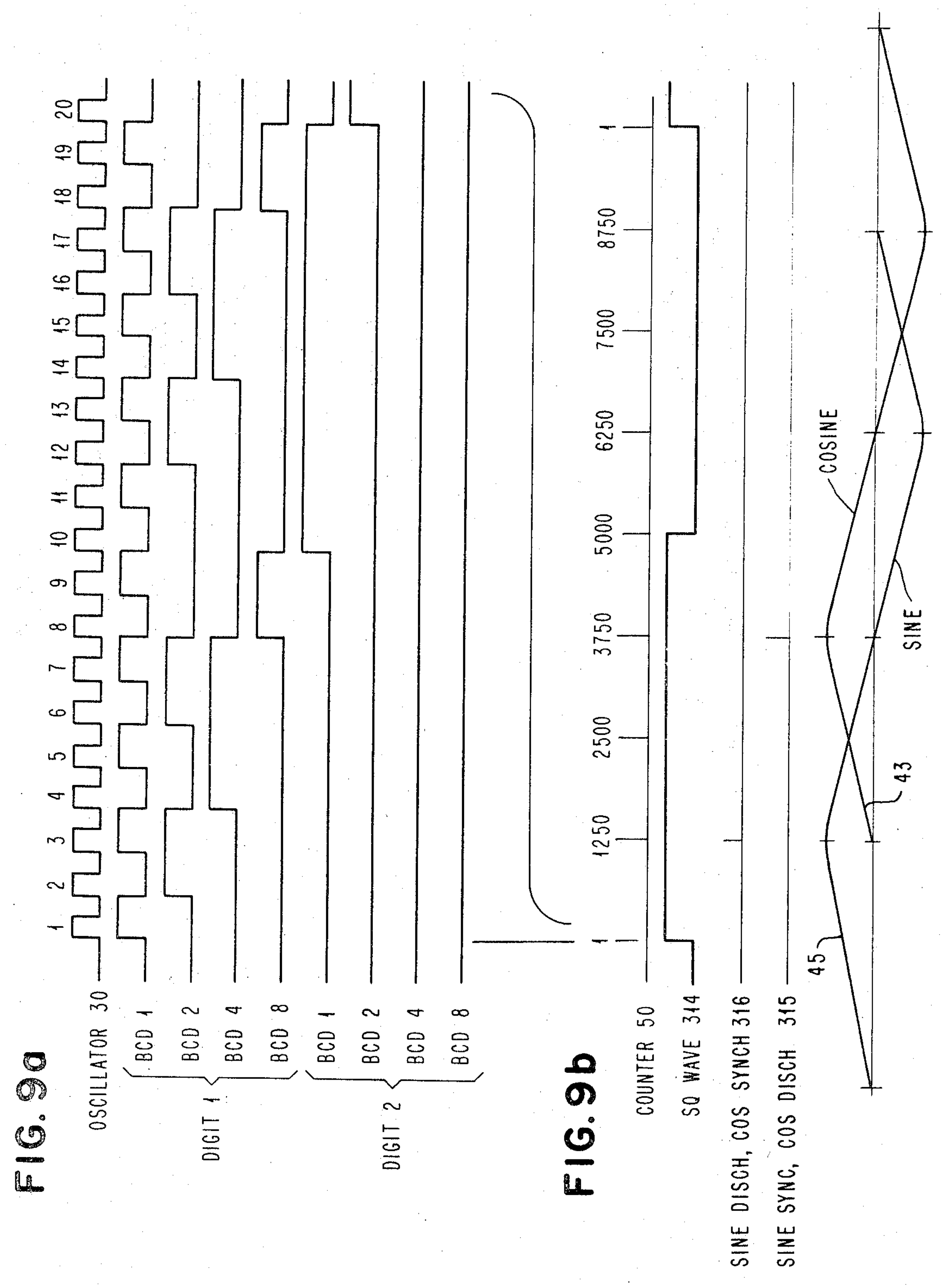

FIG. 9a is a waveform diagram showing signals present in the oscillator and counter.

FIG. 9b is a waveform diagram showing signals present during operation of the oscillator, the counter and in the decode logic.

Figure 9C:
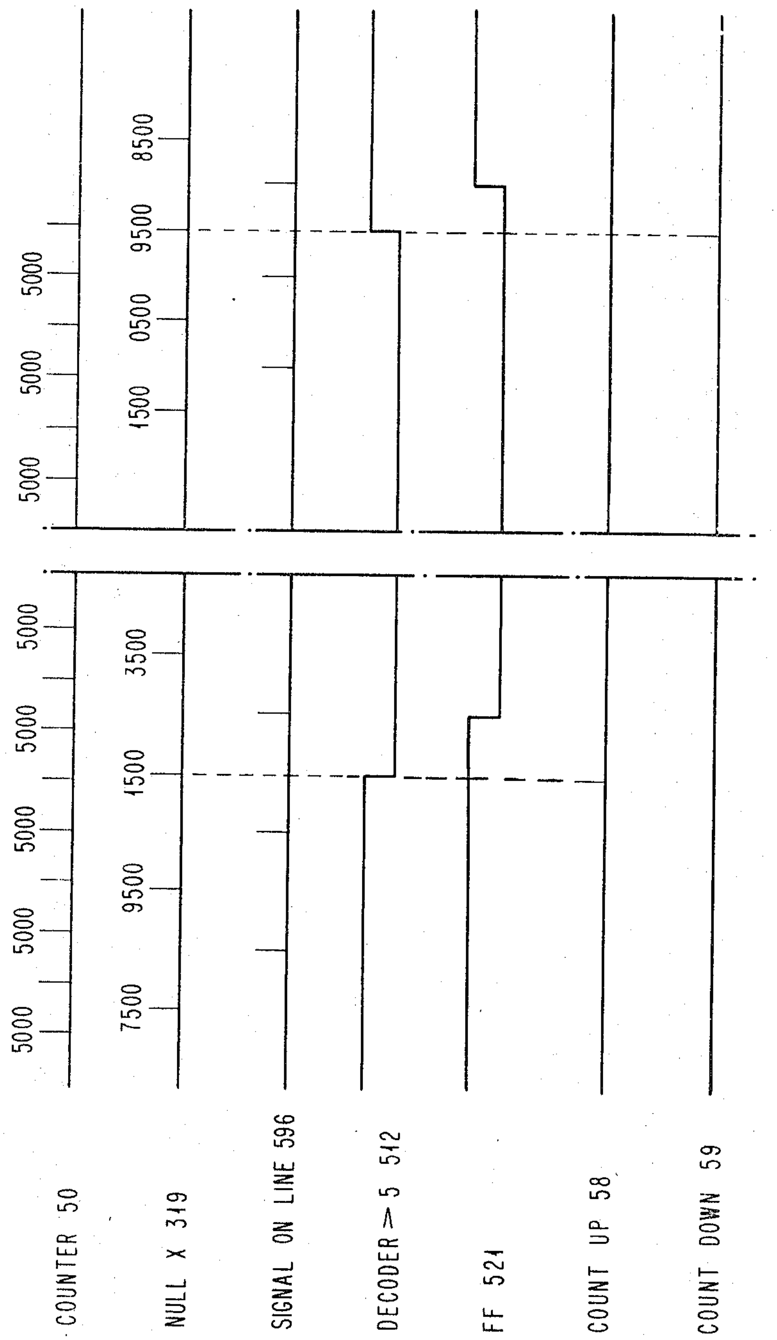

FIG. 9c is a waveform diagram showing signals present during an illustrative operation of the system.

GENERAL DESCRIPTION

Figure 1:
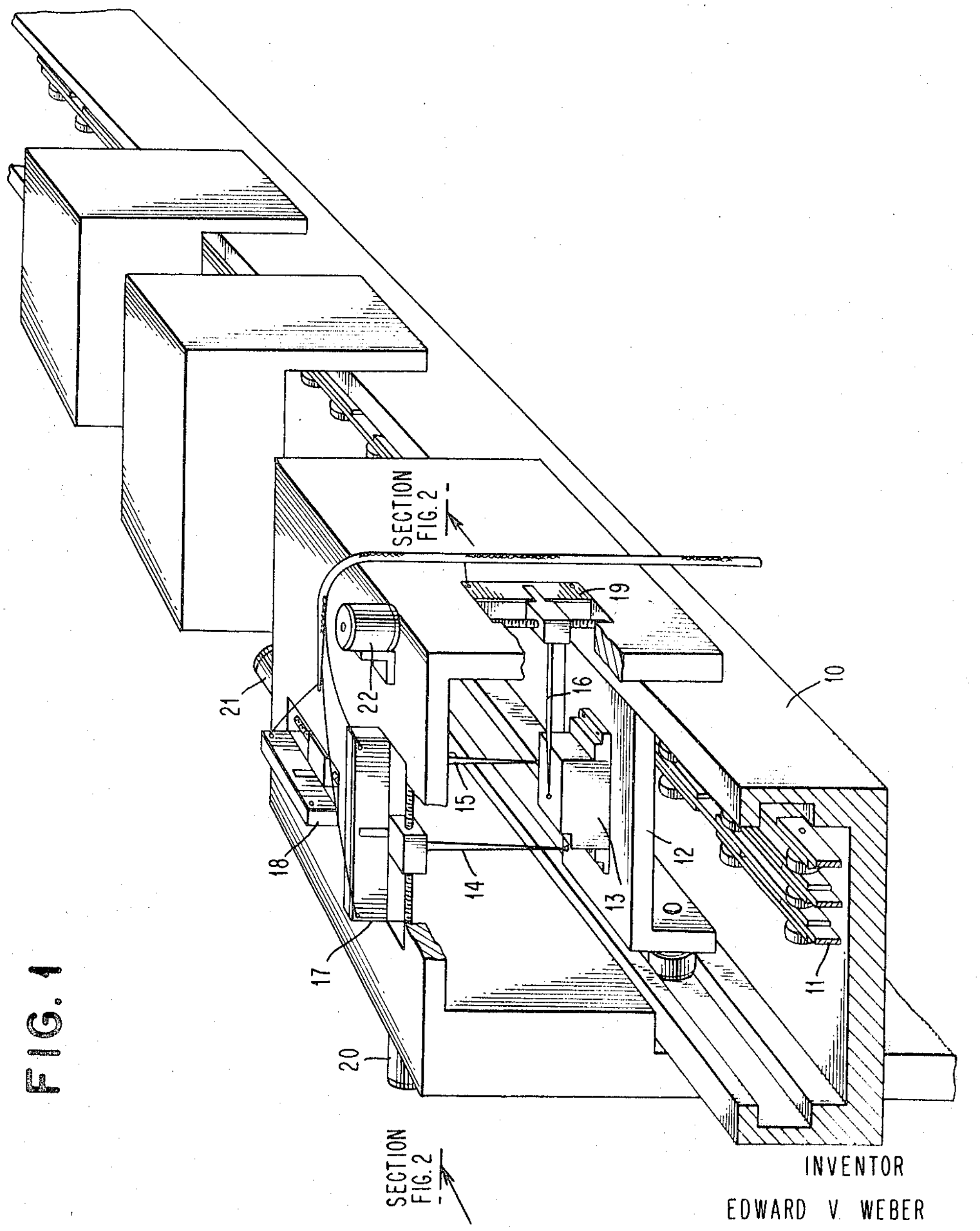
FIG. 1 is a three dimensional view of a typical manufacturing system having work stations incorporating the invention.

Referring to FIG. 1, a section of a typical manufacturing system having a number of work stations is shown. Each work station may perform one or more manufacturing operations. Further details of the construction and operation of a manufacturing system of the type shown in FIG. 1 may be found in U.S. Re. Pat. No. 25,886. The system includes a conveyor bed 10 carrying a movable conveyor chain 11 upon which rides a pallet 12 having a fixedly mounted workpiece 13. Additional pallets 12 may simultaneously move along the line, only the one pallet which is currently stationary at one of the work stations being shown for illustration.

The workpiece 13 is sensed in three dimensions by three probes 14, 15 and 16. At one illustrative work station, which may in addition perform other operations, each of the probes is driven into contact with the surface of the workpiece 13 by means of screws operated by motors 20, 21 and 22. The positions of the probes 14, 15 and 16 are sensed by slider-type magnetic transducers (called "sensors" hereinafter).

Figure 2:
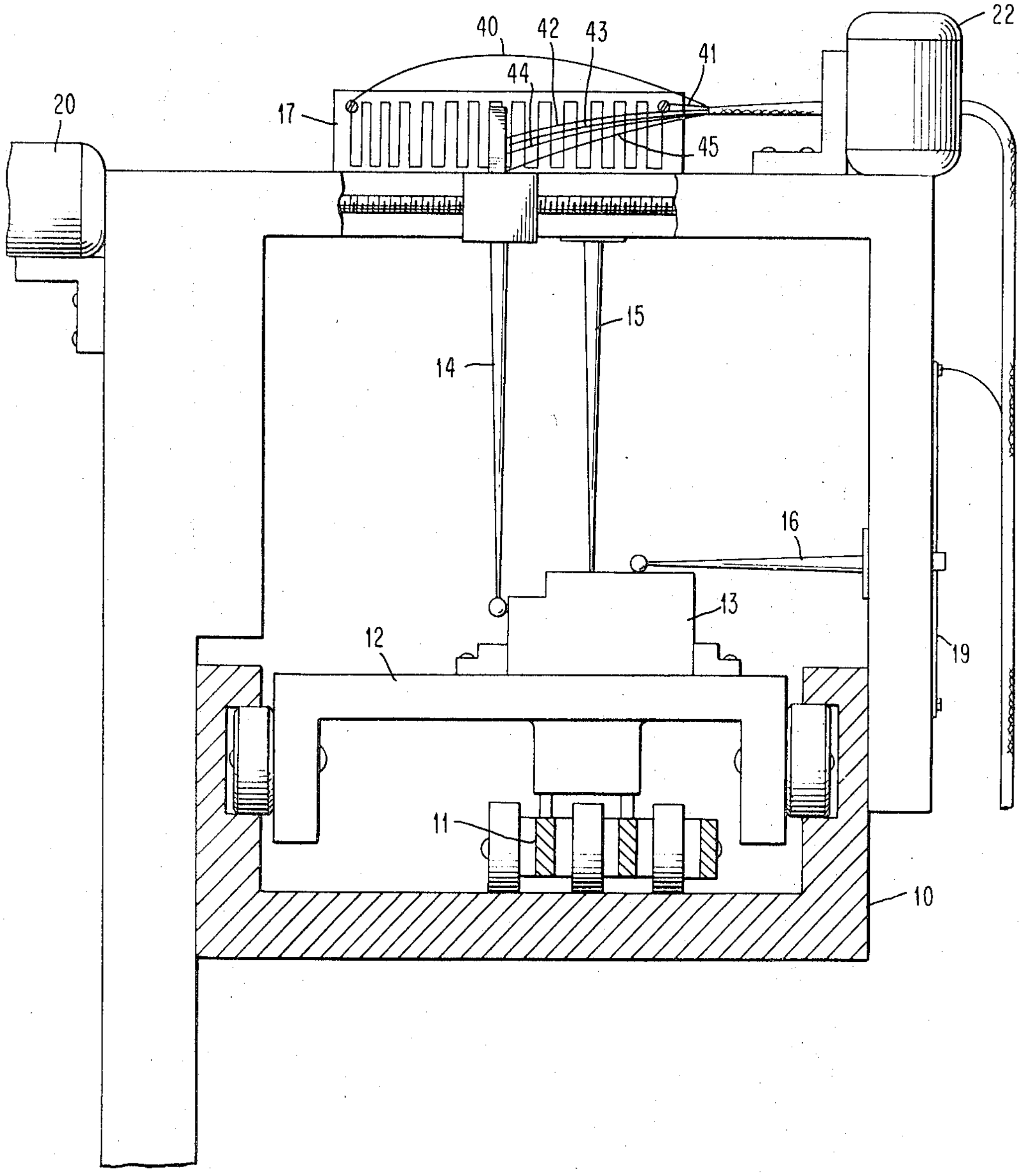
FIG. 2 is a cross section through one of the work stations of the manufacturing system shown in FIG. 1.

FIG. 2 shows a cross section at the location of sensor 17 in FIG. 1. It is here seen that the particular sensor 17 comprises a fixed scale (secondary winding) connected to wires 40 and 41 and a movable slider (primary winding) connected to the probe 14 and to wires 42, 43, 44 and 45. A schematic of the slider 17 appears in FIG. 4.

Figure 3:
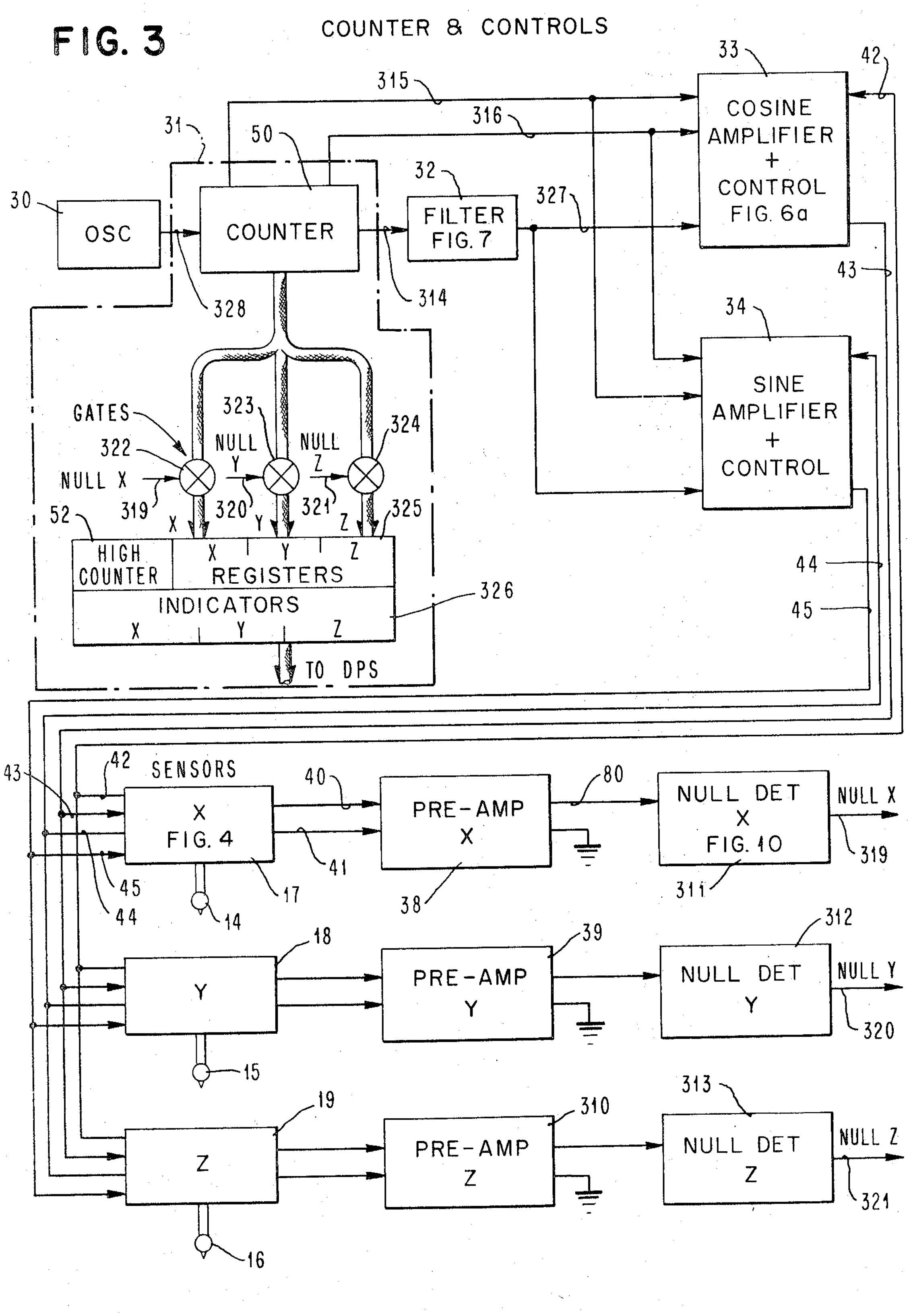
FIG. 3 is a logic diagram of electronic circuitry associated with the work station of FIG. 2.

Referring to FIG. 3, circuits for converting the physical dimensions (illustratively: X, Y and Z) sensed by the sensors into electric signals will now be described. The probes 14, 15 and 16 associated with respective ones of the sensors 17, 18 and 19 cause a phase shift in the signal emerging from sensors relative to the phase of the signals supplied to the sensors. Input signals are supplied on lines 42, 43, 44 and 45 to the sensor for dimension X. The signal emerging from this sensor on lines 40 and 41 is supplied to a preamplifier 38 for dimension X. The preamplifier 38 is connected via line 80 to a null detector 311 for dimension X which senses when the sensor output signal passes through a predetermined value (zero for illustration) and, at such time, places a pulse called "null X" on line 319. Similar circuits may be provided for sensors 18 and 19.

An oscillator 30 supplies a series of signals on line 328 to step counter 50 through a sequence of counts. While the number of counts through which the counter 50 is stepped is irrelevant, for purposes of illustration the counter 50 shown counts from 1 through 10,000. When 10,000 is reached the counter recycles to 1 and resumes counting. The counter sends signals to the cosine amplifier and control 33 and the sine amplifier and control 34 on lines 315 and 316, and, as a result, the sensors 17, 18 and 19 receive sine signals and cosine signals from the cosine amplifier and control 33 and the sine amplifier and control 34. While required by the particular sensors chosen in the disclosed embodiment, it is not essential to the invention that the signals supplied to the sensors be sinusoidal or bear a sine/cosine relationship to each other. For purposes of illustration only, the counter 50 reverses a signal on line 314 at counts 1 and 5,000 and a filter 32 extracts a cyclical wave which is placed on line 327. The cosine amplifier and control 33 utilizes the cyclical wave on line 327 to generate another cyclical (cosine) wave on line 43. This latter wave starts at zero when the counter 50 contains the number 1,250 and places a signal on line 315 and reaches a maximum when the counter 50 places a signal on line 316 upon reaching the number 3,750. The cosine wave on line 43 will continue in synchronism with the counter 50, passing through zero at counts of 1,250 and 6,250, and reaching peaks at counts of 3,750 and 8,750. Similarly, the sine amplifier and control 34 receives signals on lines 327, 315 and 316 to supply a (sine) wave on line 45 which passes through zero at counts of 3,750 and 8,750, and reaches peaks at counts of 1,250 and 6,250.

A cable from counter 50 is connected to gates 322, 323 and 324 which are operated, respectively, by the null X, null Y and null Z signals on lines 319, 320 and 321 from corresponding ones of the null detectors 311, 312 and 313. Signals on these "null" lines gate the contents of the counter 50 into registers 325, corresponding to each of the three X, Y and Z axes. There are also provided indicators 326 for visually, or otherwise, indicating the current contents of corresponding ones of the registers 325. As will be explained later, a high counter 52 extends the range of the registers 325 is sensed by corresponding ones of indicators 326. Further workpiece be made to a data processing system (DPS).

The operation of the system will now be generally described, with reference to the position of an illustrative sensor, sensor 17 for dimension X. Referring first to FIGS. 1 and 2, assume that the probe 14 connected to the sensor 17 initially touches the workpiece 13 as shown. Subsequently, the probe will be repositioned to touch the opposite side of the workpiece 13, thus providing two points on the "X" axis for measuring the X dimension of the work piece 13.

Referring now to FIG. 3, the oscillator 30 steps the counter 50 from a count of 1 through a count of 10,000, at which time the counter 50 recycles to count 1. The polarity of a signal level of line 314 is reversed at counts 1 and 5,000 to supply a square wave having a period of 10,000 to filter 32. As a result, filter 32 supplies a cyclical signal having a period of 10,000 on line 327 to the cosine amplifier and control 33 and the sine amplifier and control 34. The counter 50 also supplies signals at count 1,250 on line 316 and at count 3,750 on line 315. The signals on line 315 and 316 cause the cosine amplifier and control 33 to supply a cyclical signal passing through zero in a positive direction at count 1,250, reaching a positive maximum at count 3,750, passing through zero in a negative direction at count 6,250, reaching a negative maximum at count 8.750 returning to zero at count 1,250. The signals on lines 315 and 316 are applied to the sine amplifier and control 34 in reverse order to cause it to supply a cyclical (sine) signal 90° in advance of the (cosine) signal from the cosine amplifier and control 33. This sine signal will pass through zero at counts 3,750 and 8.750 and will reach maximums at counts 1,250 and 6,250. The movable excited primary winding of sensor 17 receives the sine signal on lines 44 and 45 and the cosine signal on lines 42 and 43.

The fixed secondary winding of the sensor 17 supplies to the preamplifier 38 a cyclical signal on lines 40 and 41 which differs in phase from the incoming sine and cosine signals as a function of the sensor's position. Whenever the cyclical signal from the sensor 17 passes through zero, a pulse appears on line 319 of the null detector 311. This pulse is applied to gate 322 to place the contents, assumed to be 7,500, of the counter 50 into the X portion of registers 325. As long as the probe's position is unchanged, the same count (7,500) will be repeatedly gated into the register.

Assume now, in FIG. 1, that the probe is moved to the opposite surface of the workpiece 13. Then, referring again to FIG. 3, the phase of the sensor 17 output signal will change as a function of the new position of the sensor. The null detector 311 will therefore detect the passage of the signal from the sensor 17 through zero at a different time than before and the pulse on the null detector 311 output line 319 will be applied to the gate 322 at this different time. As a result the counter 50 will contain a higher count (in this example: 9,500) which is a function of the sensor's new position and which is gated into the register 325. This figure 9.500 may be directly utilized, or a data processing system may be used to calculate the X dimension of the workpiece represented by this number relative to the previous number 7,500. For example, if a full count of 10,000 represents one meter, the X dimension is 200 millimeters.

DETAILED DESCRIPTION

The following description will refer to the logic diagrams of FIGS. 4 through 6*a* and the waveform diagrams of FIGS. 9*a* through 9*c*. The circuit diagrams of FIGS. 6*b* through 8 will be separately described.

Sensors

Figure 4:
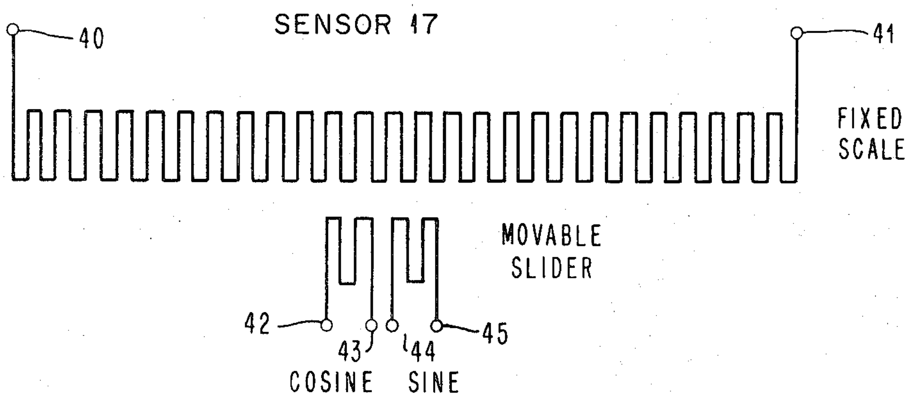
FIG. 4 is a schematic diagram of a typical sensor.

Referring to FIG. 4, the sensor 17, illustrative of the transducers that may be used with the invention, is identical to sensors 18 and 19. An illustrative sensor (Model 100 manufactured by Farrand Controls, Inc. Valhalla, N.Y.) comprises a fixed secondary winding ("scale") connected to lines 40 and 41, movable primary windings ("slider") excited by cosine signals on lines 42 and 43 and sine signals on lines 44 and 45. The primary windings are excited and a cyclical signal is generated in the scale winding. The phase of this cyclical signal relative to the phase of either slider winding signal is a function of the position of the slider along the axis of the scale much in the manner of rotatable "resolvers" or "synchros." For details of the construction and operation of such transducers, reference is made, for example, to "Electromechanical Design" Jan. 1965, pages 117 through 132.

Counter and Controls

Referring to FIG. 5*a*, the counter and controls 31 are shown comprising a counter 50, a gated register 325, a high counter 52, indicators 326, decode logic 58 and high counter controls 56. The gated register 325, high counter 52 and indicators 326 are normally duplicated for each dimension (for example: X, Y and Z) to be measured. The counter 50, gated register 325 and indicators 53 perform and record the necessary counting operations for one full cycle of measurement (for example: a count of 10,000). The high counter 52 and indicators 54 are, in effect, higher orders extending the normal maximum limit of measurement (past that possible with a count of 10,000) without changing the normal counter measurement cycle.

The counter 50 comprises a four-digit counter incremented by signals from the oscillator 30. This counter may comprise a single binary counter with appropriate binary to decimal conversion circuits, or it may comprise separate binary coded decimal counters for each decimal digit, or it may comprise decimal counter stages. The contents of counter 50 are made available to the X dimension gated register 325 and also to Y dimension and Z dimension registers (not shown). The gated register 325 is in turn gated to the low section 53 of the indicators 326 by a signal on the null X line 319. The contents of the counter 50 are also sensed by decode logic 58 which make available to the sine amplifier and control 34 and the cosine amplifier and control 33 signals necessary to operate the sensors 17, 18 and 19.

The high counter 52 is similar to the counter 50 except that it may be selectively incremented and decremented in accordance with signals on count-up line 58 and count-down line 59. This counter may comprise either a binary, a binary-coded-decimal or a decimal counter. The contents of counter 52 are transferred by a null X signal on line 319 to the high section 54 of the indicators 326 in the same manner as are the contents of register 325.

Decode Logic

Referring to FIG. 5*b*, a logic diagram of the decode logic connected to the counter 50 are shown. The decode logic 55 supplies cyclical signals, needed to operate the sensors, as a function of the counter controls. Only one decode logic 55 is required regardless of the number of dimensions measured. The decoder 510 senses the contents of the counter 50 and translates these contents into decimal digits. For example, if the counter 50 uses a binary-coded-decimal-counter, each of the digit inputs shown comprises four bit-lines. Standard flip-flop (FF) 511 is set to the 1 state by a set signal on the S input to place a signal level on the 1 output, and is reset to the 0 state by a reset signal at the R input to place a signal level at its 0 output and remove the signal level at the 1 output. Assuming that the counter 50 counts from 1 to 10,000, it is seen that when the count reaches 1,250 a signal is placed on line 316 to the sine discharge input of the sine amplifier and control 33 and to the cosine synchronization input of the cosine amplifier and control 34. When the count reaches 3,750 a signal is applied on line 315 to the sine synchronization input of the sine amplifier and control 33 and to the cosine discharge input of the cosine amplifier and controls 34. When the count is 1 flip-flop 511 is set to the 1 state placing a signal level on line 314 to filter 32, and when the count reaches 5,000, the flip-flop 511 is reset to remove the signal on the line 314.

High Counter Controls

Referring to FIG. 5*c*, the high counter controls connected to the high counter 52 are shown in logic block form. These controls extend direction capacity of the register 325 by recognizing the direction in which the value contained in the register 325 has passed a predetermined value during successive null signals. One set of controls is provided for each dimension to be measured. The high counter controls for the X dimension will be explained in detail for illustration.

The null X signal on line 319, from the null detector 311 and a signal on line 57, indicating the contents last gated out of the highest order digit 4 in the register 325, are supplied to the high counter controls 56 to generate count-up and count-down signals on lines 58 and 59. A null signal on line 319 causes single shot 520 to supply a positive pulse of suitable duration to inverter 513. Upon the fall of the positive pulse from single shot 520, single shot 595 provides an enabling pulse which is short relative to the duration of the pulse from the single shot 520. The timing of single shot 520 is chosen so that it and single shot 595 enable AND circuits 515 and 516 approximately halfway between occurrences of successive nulls occurring on line 319. Therefore, following each null signal, AND circuit 515 is enabled for reception of a signal from decoder 512 indicating that counter 50 digit 4 is more than 5, and AND circuit 516 is enabled for reception of a signal via inverter 575 indicating that this digit was less than 5. If the current value of the digit 4 is more than 5, flip-flop 521 will be set to the 1 state enabling AND circuit 518. If the current value of the digit 4 is less than 5, the flip-flop will be reset to the 0 state enabling AND circuit 519. When the next null signal occurs, the flip-flop 521 will continue to store the value that digit 4 was at the time of the previous null signal. Since the counter 50 continues to count between successive null signals, the contents of the counter may be different at the time the next null signal occurs. This next null signal on line 319 samples both AND circuits 518 and 519 and puts a count-down signal on line 59 if the value of digit 4 was less that 5 but is now more than 5. Similarly, if the value was more than 5, and decoder 512 indicates via inverter circuit 514 that the value is now less than 5, AND circuit 518 places a signal on count-up line 58.

The logic diagram of FIG. 5*c* is illustrative only, and does not intend to cover all possible embodiments of the invention. For example, possible ambiguity could be eliminated by designing the decoder 512 to instead note when the digit 4 is less than 3 and when it is more than 7.

Cosine Amplifier and Controls

FIG. 6*a* is a logic block diagram of the cosine amplifier and control 33 and is representative of the sine amplifier and control 34. The cosine amplifier and control 33 receives a cyclical signal from the filter 32 which is shifted (plus 45°) in phase to supply a cyclical signal to sensor 17 following the signal (the signal from filter 32 shifted minus 45°) from the sine amplifier and control 34 by 90°. The circuits used to form the cosine amplifier and control 33 will be separately discussed.

Amplifier 60 receives signals on line 65 arriving from phase controller 63 (which performs the 45° shift) and on line 64 from amplitude controller 61. The amplifier's output is supplied to amplitude controller 61 and synchronization controller 62 on line 66. Synchronizer controller 62 is connected to phase controller 63 via line 67. A signal on line 316 at count 1,250 causes synchronization controller 62 to adjust phase controller 63 to insure that a cyclical signal appears on line 65 with zero crossings at the times that count 1,250 and 6,250 are reached. A signal on line 315 at count 3,750 causes amplitude controller 61 to adjust amplifier 60 to insure that the signal on line 65 emerges on line 42 with maximum positive and negative values at counts 3,750 and 8,750 respectively. The sine amplifier and control 33 is identical except that the counter signals applied to lines 315 and 316 and the sign of the shift introduced by phase controller 63 are reversed so that the output signal on line 44 is 90° in advance of that on line 42.

Detailed Operation

The detailed operation of the invention will now be described, with particular reference to the waveform diagrams of FIGS. 9*a*, 9*b* and 9*c*. FIGS. 9*a* and 9*b* illustrate signals present during repeated operations of the circuits comprising the invention. FIG. 9*c* shows signals present during an illustrative operation of the invention.

Referring first to FIG. 9*a* and to FIG. 5*a*, pulses from the oscillator 30 operate the counter 50 digit 1, which comprises, in this example, a series of bistable devices alternatively set to the 1 state and to the 0 state by successive oscillator signals. For example, the fifth pulse from oscillator 50 causes digit 1 to represent the decimal number 5. It should be noted, that while binary-coded-decimal counting would ordinarily proceed to 15 before recycling to zero, each digit, in this example, is adjusted by well known "excess six" techniques to count to 9 and then recycle to zero.

Referring now to FIG. 9*b*, the value contained in the counter 50 for the first 10,000 oscillator pulses is shown. Referring also to FIG. 5*b*, a signal is present on line 314 during the interval from the first oscillator pulse to the 5,000th oscillator pulse. Also, a pulse appears on the cosine synchronization line 316 on the 1,250th pulse of the oscillator 30. A signal appears upon a cosine discharge line 315 when the 3,750th pulse of the oscillator 30 is reached. The oscillator 30, as shown in FIG. 9*a*, will continue counting the counter 50 until the counter reaches 10,000 at which time it will recycle to 1. The signals on lines 314, 315 and 316, as shown in FIG. 9*b*, will be repeatedly generated whenever the counter has reached the indicated counts causing the cosine amplifier and control 33 and sine amplifier and control 34 to supply "-cosine" and "sine" signals on lines 43 and 45.

Referring now to FIG. 9*c* and FIG. 3, it is assumed that the probe 13 connected to the slider 17 is initially at a position resulting in a count of 7,500 whenever a null X signal appears on line 319. It is further assumed that the probe is moved causing different numbers to be in the counter during successive null X signals on line 319. The first signal on the null X line 319 occurs at a time when the counter 50 contains the number 7,500. The null X signal on line 319 causes the contents of the counter 50 to be gated through the gate 322 into the registers 325. Due to the movement of the probe 13 since the occurrence of the last null X signal on line 319, the counter will now be at count 9,500. This count is gated into the register 325 replacing the previous quantity stored therein. The probe 13 continues to move in the same direction passing the position equivalent to a count of 10,000 so that when the next signal appears on the null X line 319 the counter 50 will contain the number 1,500. This number will be gated into the register 325 to replace the previous quantity stored therein. However, the number 1,500 is ambiguous, since it does not indicate whether the probe has moved the equivalent of 2,000 upward or 8,000 downward since the last occurrence of the null X signal on line 319. This ambiguity is resolved in the high counter controls 56 of FIG. 5*c* where the signal on line 596 has, prior to the occurrence of count 1,500, recorded in the flip-flop 521 the fact that at the time of the last null on line 319 the fourth digit of the register 325 was more than 5 by setting flip-flop 521 to the 1 state. Upon the occurrence of the null X signal on line 319 at the time that the counter contains 1,500, AND circuit 518 will be enabled because the decoder 512 indicates that the current value of the fourth digit is now less than 5. Thus a signal will appear on line 58 which, in FIG. 5*a*, will cause the high counter 52 to be incremented by 1. The high counter 52 will thus indicate that the maximum value of the contents of register 325 have been increased in the upward direction.

Still referring to FIG. 9*c*, the movement of the probe in the opposite direction will similarly cause the high counter 52 to be decremented by 1. This is shown by the occurrence of successive null X signals on the line 319 at times when the counter 50 contains the counts 500 and then 9,500. The flip-flop 521 remains set to the 1 state in accordance with the signal from AND circuit 515 indicating that the decoder 512 shows that the fourth digit of the register 325 is less than 5. Thus, upon the occurrence of the null X signal on line 319, when the counter contains the number 9,500, the decoder 512 will show that the fourth digit is now more than 5 causing operation of AND circuit 519 and placing a signal on line 59 to cause the counter 52 to be decremented by 1.

Only the X dimension has been described. Since the counter 50 serves all other dimensions, the operation of the control during sequential or simultaneous measurement of a plurality of dimensions is identical, the current contents of the counter 50 during appropriate nulls being stored in the register 325 and high counter 52 corresponding to each dimension.

Circuits

An illustrative amplifier 60 is shown in FIG. 6*b*. A suitable phase shifted reference cosine signal voltage on line 65 is converted to a similar phase amplitude controlled current flowing out of line 43, the amplitude of which is controlled by the current flowing in line 64. Transistors T5, T6 and T7 provide a fixed current bias so that the average current flowing in line 43 is zero. Transistor T8 provides a cosinesoidal current in response to its drive from T3 which in turn is driven by a difference-pair T1 and T2. The current flowing out of 43 returns via terminal 42 and resistor 612 to ground making the voltage on terminal 42 proportional to the current flowing in the sensors 17. A portion of this voltage is returned to the base of transistor T2 by the voltage dividers 611B and 613. The fraction of this voltage feedback, and hence the amplitude of the current flowing in line 43, is controlled by the value of the photoconductive resistor 611B which in turn is controlled by the current in line 64 flowing through lamp 611A.

Phase controller 63 of FIG. 6*c* accepts a precise sine wave on line 327, shifts its phase a nominal 45° (minus 45° when used in the sine amplifier and controller 34) plus some slight correction and puts it on line 65 for application to amplifier 60. A control current from a synchronization controller 62 enters line 67, adjusts the illumination of the lamp 68A and hence the value of the photoconductive resistor 68B thereby modifying the phase of the output signal 65 relative to its input on 327.

Synchronization controller 62 shown in FIG. 6*d* has the function of observing the zero crossing of the signal on line 66 at the instant when it should be crossing zero as indicated by a reference pulse on line 315, and providing appropriate correction signal on line 67 to cause the phase controller 63 to correct the phase of the cosine wave on line 65 of FIG. 6*c*. Transistors T111, T112, T113 and T114 along with their associated components form a classical "quad-diode" sampling circuit which samples the signal on line 66 during a pulse on line 315 thus storing a charge on capacitor 617 equal to the voltage on line 66 during the sample time. It can readily be seen that if the normal sample time on line 315 should occur at the positive zero crossing of a cosinesoidal wave, lagging phase will cause a positive voltage to appear on capacitor 617 while leading phase will cause negative voltage to appear. Any error voltage appearing on capacitor 617 is amplified by the amplifiers consisting of transistors T115, T116, T117, T118 and T119 thus providing an error voltage at the positive end of the adjustment potentiometer 618. This causes the amplifier consisting of the transistors T120, T121 and T122 to change the output current on line 67 which substantially controls the photoconductive resistor 68B and the phase controller 63, FIG. 6c.

The amplitude controller 61, FIG. 6e, provides the control current to the lamp 611A adjusting the photoconductive resistor 611B in FIG. 6b via line 64 so as to maintain the current flowing out of terminal 43 of the amplifier of FIG. 6b at some precisely constant value. Transistors T9 and T10 form a difference-pair which continually compare the amplitude of the voltage on line 66 with the reference voltage set on potentiometer 614. When the positive peaks of the voltage on line 66 exceed the reference voltage; capacitor 615 is charged positively via the amplifier formed by transistors T11 and T12. As the voltage on capacitor 615 becomes more positive, the amplifier formed by transistors T14, T15 and T16 causes the positive end of the potentiometer 616 to become more positive. This increases the drive signal to the amplifier formed by transistors T17, T18 and T19 which in turn passes more current out of terminal 64 reducing amplifier 60 gain. When the peak signal on line 66 is less than the reference voltage set on the potentiometer 614 the voltage on capacitor 615 must be reduced. This is accomplished by short discharge pulses timed to appear on line 316 at the peak of the signal on line 43 which causes slight discharge of capacitor 615 via transistor T13. This discharge, if not compensated for by charging current from T12 will result in a lesser current flowing in line 64 and hence an increase of the drive signal out of amplifier 60. Loop gain is sufficient to maintain amplitude constant to a fraction of a percent for normal variations.

Filter 32, FIG. 7, accepts a square wave from the counter control 31, extracts the fundamental signal and provides an output drive to the phase controller 63. The square wave from the counter controls appears on line 314 and is amplitude regulated and impedance matched by a combination of transistors T124 and zener diode 619. The components 620 form a sharp cutoff low-pass filter with maximum rejection stop bands in the attenuation area adjusted to match undesirable odd harmonics producing an extremely low distortion accurate phase signal at the base of transistor T125. The amplifier consisting of T125 and T126 forms an impedance matching and drive network for the subsequent phase controller 63.

Null detector 311 is shown in FIG. 8. The low output level from the scale 17 is suitable amplified by a high quality preamplifier whose output is applied to terminal 80. The following squaring circuits terminate in a single shot 81, provide a pulse at the time of a positive zero crossing of the scale signal. The input signal from the preamplifier line 80 is impedance matched, level shifted and filtered by the amplifier combination including transistors T127, T128, T129 and T130. This is followed by four essentially identical stages of amplification and clipping including transistors T131, T132, T133 and T134 to result in a square wave signal at T137 with a rise time in excess of the time resolution required for normal detection. Transistors T136 and T137 provide appropriate level shifting and drive for the single shot 81 which forms a short pulse on 319 at the instant of positive zero crossing of the signal from the scale 17 which indicates mechanical position.

There has been described a position measuring system in a manufacturing system environment. The environment of the invention is not intended to be limiting, and the particular elements forming the invention are all subject to substitution.

While the invention has been particularly shown and described with reference to a preferred embodiment thereof, it will be understood by those skilled in the art that the foregoing and other changes in form and details may be made therein without departing from the spirit and scope of the invention.

I claim:

1. A multidimensional position sensing system including:

a number of position sensors, each responsive to a physical position to affect a source signal as a function of such position;

a single oscillator and a single first counter connected to said sensors to supply said source signal to said sensors on predetermined counts;

means including a synchronization control circuit and an amplitude control circuit for measuring the relationship between the counter content and the source signal received by said sensors to detect and compensate for phase and amplitude errors in said source signals;

a number of detectors each associated with a position sensor and each adapted to produce a signal when said source signal as affected has a predetermined value;

a number of first recording means connected to said first counter, each associated with a position sensor;

means to transfer the current count in said first counter to said first recording means to indicate the current positions of said sensors upon the production of a signal by said detectors; and decoding and control means connected to said first counter for recognizing and recording when the ,current count passes a chosen value in one direction and when it passes a chosen value in another direction, said means including a second counter and second recording means each associated with a position sensor and control means to control the direction of counting of said second counter to indicate the sum of the number of times that the first counter passes said chosen value in one direction less the sum of the number of times it passes the chosen value in another direction.

2. The system of claim 1, further comprising indicating means, connected to both said first and second recording means.

3. The system of claim 2 wherein the decoding and control means further comprise:

storage means, connected to said first recording and indicating means connected with the first counter, for recording a portion of the contents of said first counter at a first time; and logic means connected to said storage means and to said first counting means for comparing the aforesaid contents recorded by said storage means at said first time with a portion of the contents at a second time.

4. The invention of claim 3, further comprising control means connected to said second counter and to said logic means of said decoding and control means for decrementing said second counter when the portion of the contents of the first counter at said second time exceeds the portion of the contents recorded in the storage means at said first time and for incrementing said second counter when the contents of said second time are less than the recorded contents at said first time.

5. The invention of claim 4, wherein the first counter is a multidigit counter and the portion of its contents to which the storage, logic and control means are responsive is the highest order digit position of selected ones of the first counter and connected recording and indicating means.